US010873520B2

(12) United States Patent
Tourrilhes et al.

(10) Patent No.: US 10,873,520 B2
(45) Date of Patent: Dec. 22, 2020

(54) PACKET BATCHING IDENTIFICATION

(71) Applicant: HEWLETT PACKARD ENTERPRISE DEVELOPMENT LP, Houston, TX (US)

(72) Inventors: Jean Tourrilhes, Mountain View, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 120 days.

(21) Appl. No.: 16/025,749

(22) Filed: Jul. 2, 2018

(65) Prior Publication Data

US 2020/0007426 A1 Jan. 2, 2020

(51) Int. Cl.
*H04L 12/26* (2006.01)
*H04L 12/805* (2013.01)

(52) U.S. Cl.
CPC ............ *H04L 43/12* (2013.01); *H04L 43/028* (2013.01); *H04L 43/0894* (2013.01); *H04L 47/36* (2013.01)

(58) Field of Classification Search
CPC ... H04L 43/12; H04L 43/028; H04L 43/0894; H04L 47/36; H04L 43/08; H04L 43/14; H04L 43/50; H04L 2012/5632; H04L 47/52; H04L 2012/6456; H04L 25/0222; H04L 41/147; G01J 3/027; H04W 16/00
See application file for complete search history.

(56) References Cited

U.S. PATENT DOCUMENTS

| | | | |
|---|---|---|---|
| 7,239,611 B2 | 7/2007 | Khisti et al. | |
| 7,443,804 B2 | 10/2008 | Cheung et al. | |
| 9,270,568 B2 | 2/2016 | Flinta et al. | |
| 2002/0169880 A1* | 11/2002 | Loguinov | H04L 43/50 709/228 |
| 2014/0112148 A1* | 4/2014 | Flinta | H04L 43/10 370/235.1 |

(Continued)

OTHER PUBLICATIONS

Determination of Interrupt-coalescence Latency of Remote Hosts Through Active Measurement, Salehin K. et al., https://ieeeplore.ieee.org/stamp/stamp.jsp?arnumber=8347004, p. 1-15.

(Continued)

*Primary Examiner* — Benjamin R Bruckart
*Assistant Examiner* — Tien M Nguyen
(74) *Attorney, Agent, or Firm* — Nolte Intellectual Property Law Group

(57) ABSTRACT

The present disclosure provides a method, apparatus, and system for identifying packet batching within computer networks. A method consistent with the present disclosure includes sending a probe train of packets to traverse a network path within a computer network. Next, identifying a contiguous set of packets that traversed the network path with a negative DIAD time. Further, classifying the contiguous set of packets as a packet batch when a packet that traversed the network path right before the contiguous set of packets traversed the network path has a positive DIAD time. In addition, a size of a next probe train of packets that are to be sent to traverse the network path can be adjusted based on the size of the contiguous set of packets. Accurately identifying packet batching can enable more precise computer network bandwidth estimation and network traffic engineering solutions.

7 Claims, 7 Drawing Sheets

(56) References Cited

U.S. PATENT DOCUMENTS

2016/0218979 A1* 7/2016 Roh ................. H04L 43/16
2016/0315841 A1 10/2016 Kang et al.

OTHER PUBLICATIONS

Effects of Interrupt Coalescence on Network Measurements, Prasad, R. et al., https://www.cc.gatech.edu/fac/Constantinos.Dovrolis/Papers/intcoal_pam04.pdf, p. 1-10.

* cited by examiner

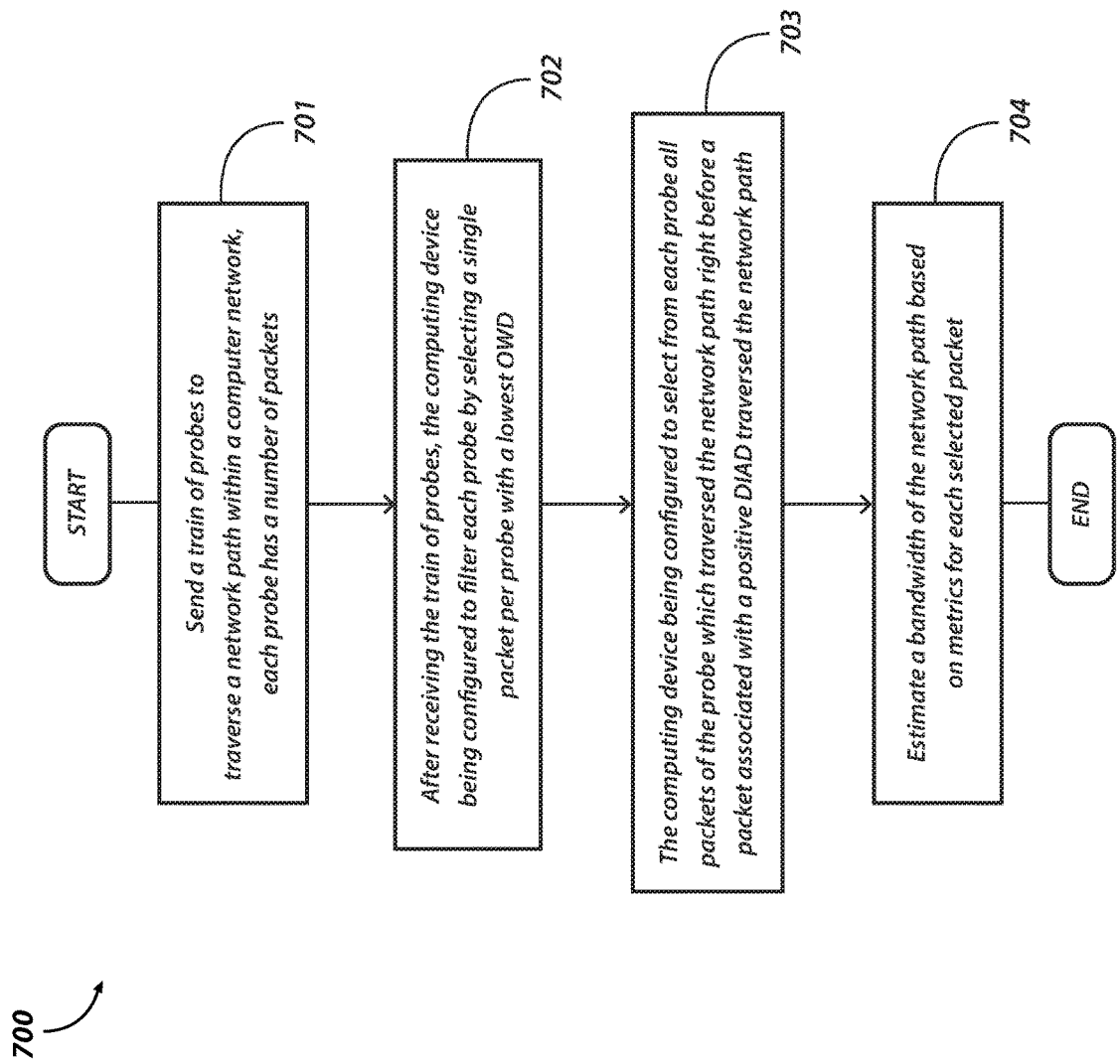

PACKET BATCHING IDENTIFICATION

BACKGROUND

In a closed network system, it is possible to collect direct measurements in computer networks and their network links. However, in many network systems, it is not feasible to implement direct bandwidth measurements on network links because network devices and respective links may be located in different administrative domains or may be hidden by the presence of tunnels or packet encapsulation. As such, bandwidth estimation is employed.

Generally, network path characteristic estimation (e.g., bandwidth estimation) includes probing a network path with specially crafted probe packets sent from one end of a network path to another end of the path. In some network path estimation systems, a device at the receiver end of the network path measures the receive times of the packets and the changes to the packet delay pattern to estimate network path characteristics such as a network path's capacity, available bandwidth, and bulk transfer capacity. The receive times and changes to a packet's delay pattern may then be used to estimate the bandwidth of the network path under observation.

Some bandwidth estimation models make an assumption that the observed delay characteristics of the network path (e.g., the receive times, the packet delay pattern, etc.) are driven by per-packet treatment of packets by devices (e.g., switches, routers, gateways) in the network path, especially due to packet queuing by switches, routers, gateways, and other network routing devices. However, this is not always the case as some network elements batch packets prior to their transmission in rapid succession in a single pass, creating a packet batch. A common source of packet batching is due to interrupt coalescence which is characteristic of many Network Interface Cards (NIC) on a receiving end of a network path.

SUMMARY

The present disclosure provides a method, apparatus, and system for identifying packet batching to improve network bandwidth estimation for computer networks. The techniques described herein enable the use of existing and future network path estimation models on paths with mild to severe packet batching.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 7 is a flowchart of a process for selecting a packet from a probe train for network bandwidth estimation consistent with a system and method of the present disclosure.

DETAILED DESCRIPTION

Figure 1:
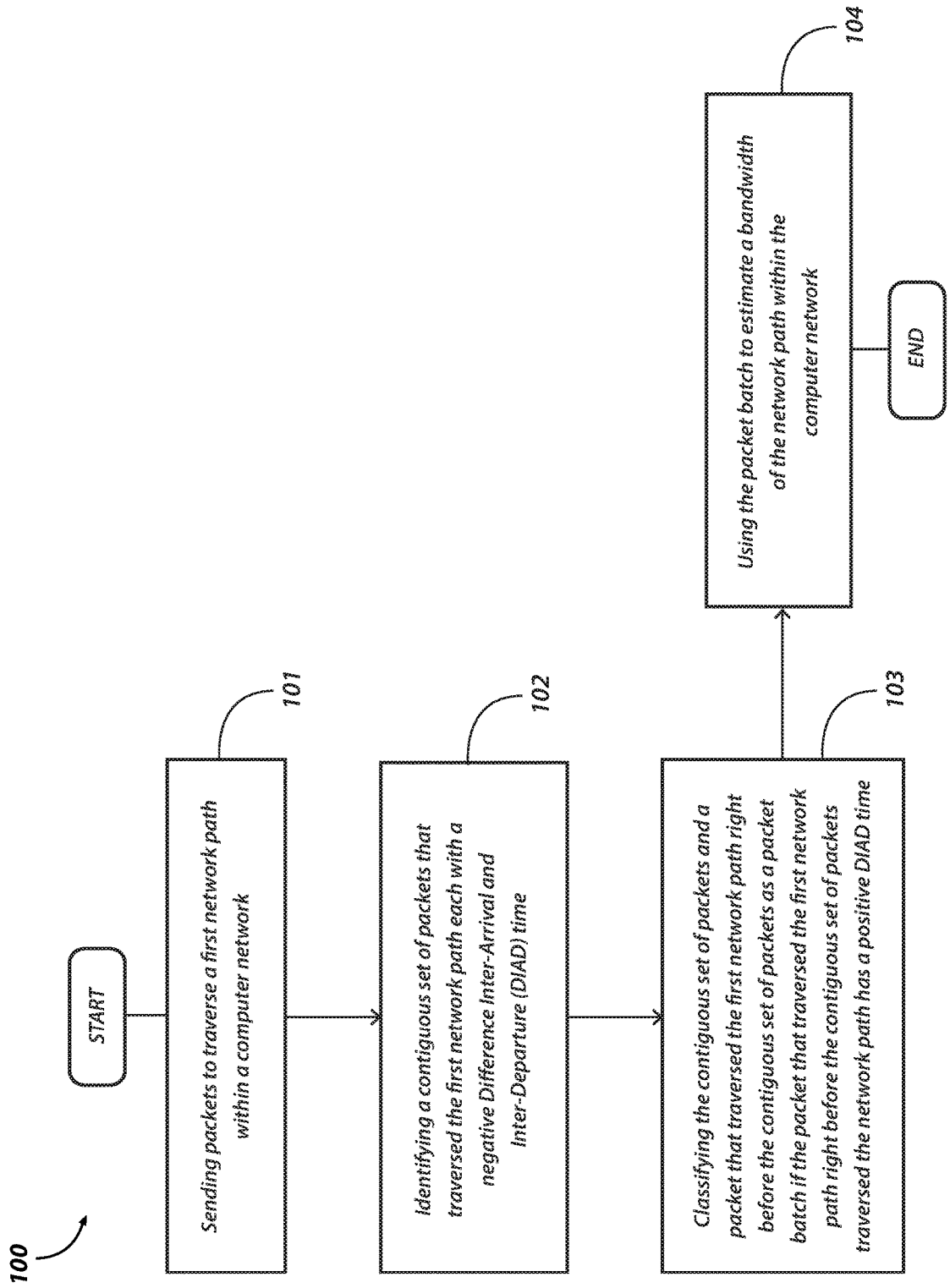
FIG. 1 is a flowchart of a process for packet batch filtering consistent with a system and method of the present disclosure.

The description of the different advantageous embodiments has been presented for purposes of illustration, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Before the present invention is described in detail, it is to be understood that, unless otherwise indicated, this disclosure is not limited to specific procedures or articles, whether described or not. It is further to be understood that the terminology used herein is for the purpose of describing particular embodiments only and is not intended to limit the scope of the present invention.

It must be noted that as used herein, and in the claims, the singular forms "a," and "the" include plural referents unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. The term "about" generally refers to ±10% of a stated value.

As will be appreciated by one skilled in the art, the present invention may be embodied as a system, method or computer program product. Accordingly, the present invention may take the form of an entirely hardware embodiment, a software embodiment (including firmware, resident software, micro-code, etc.) stored in a storage device, or an embodiment combining software and hardware aspects that may all generally be referred to herein as a "circuit," "module," or "system." Furthermore, the present invention may take the form of a computer program product embodied in any storage device having computer readable program code embodied in the medium. A storage device for storing computer readable program code does not encompass a signal propagation media such as copper cable, optical fiber or wireless transmission media.

Any combination of one or more computer-readable storage device may be utilized. The computer-readable storage device may be, for example but not limited to, an electronic, magnetic, optical, electromagnetic, infrared, or semiconductor system, apparatus, or device. More specific examples (a non-exhaustive list) of the computer-readable storage device may include the following: a portable computer diskette, a hard disk, a random access memory (RAM), a read-only memory (ROM), an erasable programmable read-only memory (EPROM or flash memory), a portable compact disc read-only memory (CDROM), an optical storage device, or a magnetic storage device processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The processor includes an arithmetic logic unit, a microprocessor, a general purpose controller or some other processor array to perform computations and provide electronic display signals to a display device. Processor processes data signals and may include various computing architectures including a complex instruction set computer (CISC) architecture, a reduced instruction set computer (RISC) architecture, or an architecture implementing a combination of instruction sets. The present disclosure includes a single processor, multiple processors may be included. Other processors, operating systems, sensors, displays and physical configurations are possible. In some embodiments, the processor includes a networking processor core that is capable of processing network data traffic.

The memory stores instructions and/or data that may be executed by the processor. The instructions and/or data may include code for performing the techniques described herein. The memory may be a dynamic random access memory (DRAM) device, a static random access memory (SRAM) device, flash memory or some other memory device. In some embodiments, the memory also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The computer program instructions may also be loaded onto a computer or other programmable data processing apparatus, such as but not limited to an expansion card such as a computer expansion card (e.g., memory expansion card or personal computer card) to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present disclosure provides a novel technique to detect packet batching to improve the accuracy of network path estimation (e.g., bandwidth estimation of the network path) and to mitigate effects of packet batching in network path estimation by properly filtering packets. This technique enables the use of existing (and future) network path estimation models on network paths with mild to severe packet batching without changing the models. The techniques described herein provides a manner of categorizing packets such that network bandwidth can be estimated more accurately by taking into account the network path conditions (e.g., whether packets were buffered and/or batched).

FIG. 1 is a flowchart 100 of a process for packet batch filtering consistent with a system and method of the present disclosure. Flowchart 100 begins with sending packets to traverse a first network path within a computer network (block 101). Next, identifying a contiguous set of packets that traversed the first network path each with a negative Difference Inter-Arrival and Inter-Departure (DIAD) time (block 102). In one embodiment, the DIAD times are computed from the Inter-Arrival Time (IAT) and IDT of a packet. For example, the DIAD times of each packet are computed by computing the difference between an Inter-Arrival Time (IAT) and an Inter-Departure Time (IDT) of a current packet that traversed the first network path.

Alternatively, the DIAD times of each packet are computed by computing the difference in One-Way Delay (OWD) time of a current packet and the OWD time of a packet which traversed the first network path just prior to the current packet.

Once the contiguous set of packets with a negative DIAD are identified, the contiguous set of packets and a packet that traversed the first network path right before the contiguous set of packets traversed the path are classified as a packet batch if the packet that traversed the first network path right before the contiguous set of packets traversed the network path has a positive DIAD time (block 103).

In some implementations, the positive DIAD time must also exceed a pre-determined threshold for the associated packet to be considered a member of the packet batch. For example, the positive DIAD threshold time may be set at a value that reduces the probability of jitter and other unrelated network timing anomalies that generate a false positive of packet batching. In one embodiment of the present disclosure, a packet batch is classified as a false positive if the first packet within the packet batch has a DIAD time that is less than a pre-determined factor of the IDT of the first packet. Additional thresholds beyond DIAD may be required to be met before classifying a set of packets as a packet batch.

In one embodiment, the pre-determined threshold is the absolute value of the sum of all of the negative DIAD times associated with the contiguous set of packets that traversed the network path right after the packet associated with the positive DIAD time traversed the path. In an alternative embodiment, the pre-determined threshold is a pre-determined factor of the IDT of that packet. Advantageously, the packet batch (at least one packet thereof) may be used to estimate a bandwidth of the network path within the computer network (block 104).

The process described herein may also include excluded from further analysis the identified packet batches according to a set of criteria. For example, the classified packet batches may be excluded if the packet length size of the batches are less than a pre-determined number of packets. In addition, the process may include sending a probe of packets to traverse a different network path within the computer network and comparing the degree of packet batching that occurs along both network paths. In some implementations, at least one of the detected contiguous set of packets may be used to estimate a bandwidth of the network path.

Figure 2:
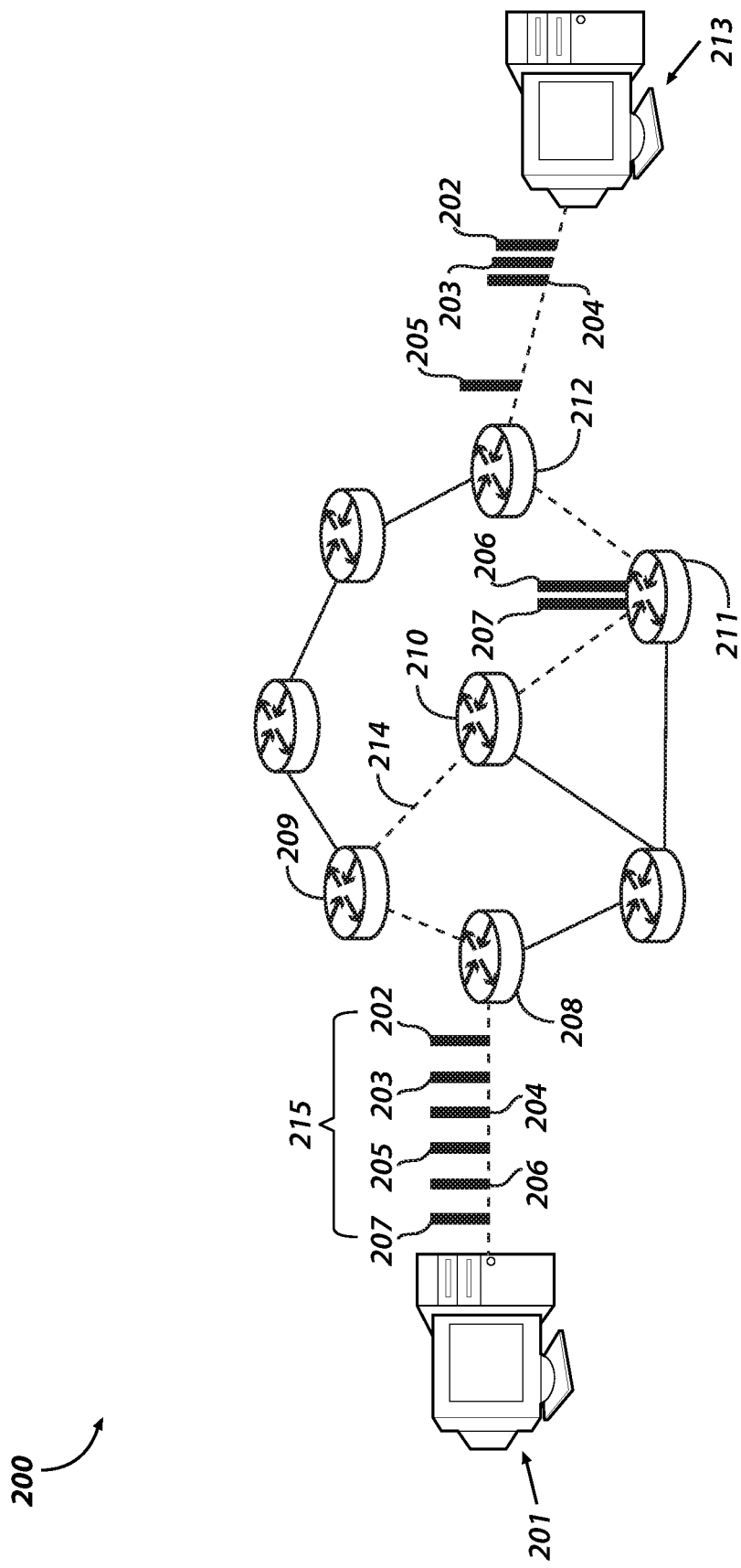
FIG. 2 is an illustration of a computer network topology used for network bandwidth estimation.

FIG. 2 is an illustration of a computer network topology (or computer network) 200 used for network bandwidth estimation. In the embodiment shown, a device (e.g., computing system) induces a probe 215 of packets into the computer network to measure the bandwidth of the various paths within the computer network 200. In the embodiment shown, the probe 215 of packets includes six test packets 202-207. However, the present disclosure is not limited thereto and may include any number of packets that is needed to determine bandwidth and other metrics of the computer network 200.

Computer network 200 includes a plurality of network devices (e.g., network devices 208-212) which can receive the probe 215 of packets from other devices and route the packets 202-207 to other network devices according to information stored within the packets. In some implementations, the destination information stored in each packet is the same such that each packet of the probe 215 traverses the same network path within the computer network 200.

Notably, an exemplary network path 214 which is shown in broken lines is traversed by the probe 215 of packets. The time that each packet of the probe 215 traverses the network path 214 relative to the time that the other packets of the probe 215 traverses the network path 214 may be used to estimate packet batching and other network traffic attributes of the computer network 200.

In some embodiments of the present disclosure, the probe 215 of packets are dispatched into the computer network in a controlled manner. For example, the probe 215 of packets may be dispatched into the computer network 200 at specific time intervals.

In the embodiment shown in FIG. 2, the probe of packets 215 are sent from computer server 201 and received at computer server 213. It should be understood by those having ordinary skill in the art that the present disclosure is not limited to a computer server to send and receive probes but may be implemented by any device known in the art such as, but not limited to, a switch, router, network gateway, or computer workstation.

As shown in the figure, the probe 215 of packets traverse network path 214 and is therefore received at and dispatched from network devices 208-212 along this route. Notably, packet batching occurs at network device 211 as is common during the transmission of packets in computer networks. A common source of packet batching is interrupt coalescence which occurs in a Network Interface Card (NIC) at a receiver end of a network path. For example, interrupt coalescence may occur in computer server 213 which is configured with a NIC and CPU according to the embodiment shown.

Another source of packet batching is from network devices which forward packets using a general-purpose CPU. In addition, link layer technologies which employ large overhead switching from one network device to another often batch packets.

As shown in FIG. 2, packets 206, 207 are received at a significant delay from packets 202-205 of the probe 215. In the example shown, network device 211 waits to dispatch packet 206 until it receives packet 207. This transmission delay may occur for device utilization efficiency and/or improved traffic conditions in the computer network. Once packet 207 is received at network device 211, the device 211 will dispatch both packets 206, 207 together as a packet batch. Moreover, in some examples, the close grouping of packets 202-204 may indicate that they were batched together at some earlier network device. As such, at least packets 203, 204 are associated with negative DIAD times.

Figure 3:
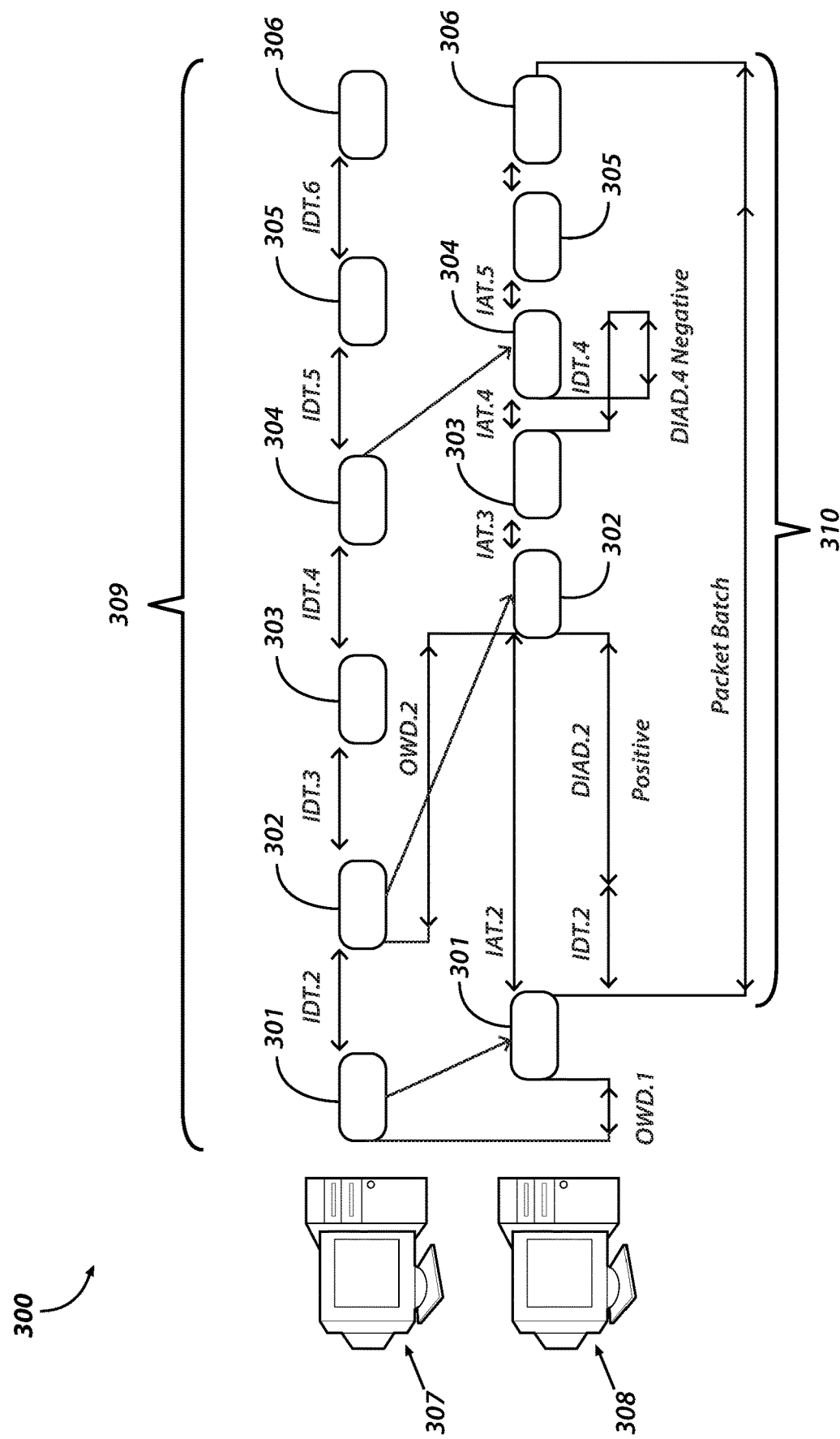
FIG. 3 is an illustration of packets of a single probe of packets traversing through a network path with various Inter-Arrival Times and Difference Inter-Arrival and Inter-Departure (DIAD) times and a manner of excluding packet batches which do not meet a pre-determined criteria.

FIG. 3 is an illustration of packets of a single probe train 309 traversing through a network path 300 with various Inter-Arrival Times and Difference Inter-Arrival and Inter-Departure (DIAD) times and a manner of excluding packet batches which do not meet a pre-determined criteria. Probe train 309 includes six packets 301-306, some of those packets may be part of the same probe or different probes. Probe train 309 is sent from a computer server 307 at one end of a network path and received at a computer server 308 or other suitable device at another end of the network path as described above.

In the exemplary embodiment shown, each packet of probe train 309 are dispatched according to a pre-determined time interval. This time interval may be referred to as an Inter-Departure Time (IDT). The IDT herein is defined as the amount of time between sending a previous packet and a current packet or simply a theoretical time interval between the dispatch of each packet within a probe.

In some implementations, a theoretical IDT may differ from an actual IDT and therefore network path estimation techniques as described herein may account for such. The pre-determined time interval between dispatching packets into the computer network may be referred to as the Inter-Departure Time (IDT) in this disclosure. In the embodiment shown, IDT.2, IDT.3, IDT.4, IDT.5, and IDT.6 associated with packets 203-207, respectively, have the same time interval. However, in other embodiments, IDT.2, IDT.3, IDT.4, IDT.5, and IDT.6 have different time intervals.

The One-Way Delay (OWD) time of each packet of the probe train 309 may be measured. The OWD may aid in the selection of a suitable packet from a probe of packets to estimate a computer network's bandwidth.

An OWD time herein is defined as the time difference between when a packet was sent along a network path and when the packet was received at an end of the network path. In the exemplary embodiment illustrated in FIG. 3, the OWD time of each packet will be measured relative to the time that the packet was sent from computer server 307 at one end of the network path and received by computer server 308 at another end of the network path.

The OWD time of a packet is primarily governed by the propagation delay of the network path, the transmission time of the slowest link within the network path, and the accumulated queuing delay attributed to the available network elements. As such, an OWD time for each packet may be computed according to the following formula:

$$OWD(i) = pd + st(size) + sum(qd(e,i))$$

Wherein:

Pd→is the total propagation delay st(size)→is the slowest transmission time for this packet size; and qd(e,i)→is the queuing delay at element e for packet i.

The OWD of packets 301, 302 are illustrated as OWD.1 and OWD.2, respectively in FIG. 3.

In addition, the amount of time between receiving a previous packet and a current packet at the end of a network path is also measured. This time interval is defined herein as the Inter-Arrival Time (IAT). If there is no packet loss or reorder, the IAT for each packet may be computed according to the following formula:

$$IAT = OWD_C - OWD_P + IDT.$$

Where $OWD_C$ may be defined as the One-Way Delay time of a current packet that traversed a network path of interest an the $OWD_p$ may be defined as the One-Way Delay time of the packet that traversed the network path just before the current packet.

Furthermore, the measured time that each packet of probe train 309 is received at the end of a network path may be compared to the other packets. If there is no network reordering, packets are received in the same order. In this case, the IAT, IDT, and OWD of each packet is directly related.

A Difference Inter-Arrival and Inter-Departure (DIAD) time herein is defined as a difference between the IAT and IDT of a packet. In an absence of reordering, the DIAD time compares the OWD of a packet to the OWD of the previous packet that traversed a network path.

In most cases, if the DIAD time is positive, this infers that the current packet has experienced more queuing delay than a previous packet that traversed the network path. Alternatively, if a DIAD time is negative, then the current packet experienced less queuing delay than the previous packet that traversed the network path. Typically, packet batching will create a negative DIAD time. If the current packet is batched with the previous packet, the previous packet waited at a network element to be transmitted for a longer duration than the current packet so the current packet will have negative DIAD times with all else being equal.

For example, FIG. 3 illustrates the DIAD times associated with packets 302, 304. Notably, the DIAD time associated with packet 302 is positive as the IAT.2 of the packet is greater than its IDT.2 as attributed to the delayed time for packet 302 to reach the device 308 at the receiver end of the network path. Accordingly, because IAT.2>IDT.2, IAT.2−IDT.2 results in a positive DIAD.2. Contrariwise, for packet 304, the DIAD.4 time is negative. As shown in the figure, IAT.4<IDT.4 resulted in a negative DIAD.4 time.

In addition, FIG. 3 shows an example of a packet batch 310. Herein, a packet batch 310 is a contiguous set of packets associated with negative DIAD times that traversed a network path plus a packet (with a positive DIAD time) that traversed the network path just before the contiguous set of packets associated with the negative DIAD times. Criteria may be set to exclude packet batches according to a packet size length.

Figure 4:
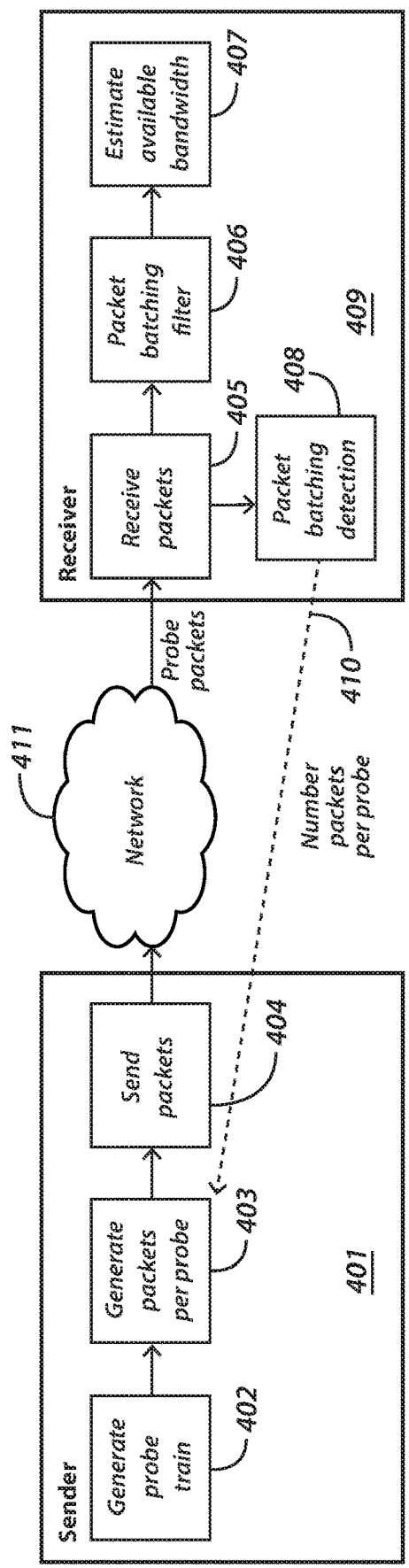
FIG. 4 is an illustration of a process for estimating the bandwidth of a network path according to a system and method consistent with the present disclosure.

FIG. 4 is an illustration of a process for estimating the bandwidth of a network path according to a system and method consistent with the present disclosure. A device 401 at a sender end of a network path and a device 409 at the receiver end of the path may be implemented as part of or outside of a computer network 411. In the embodiment shown, the device 401 at the sender end and the device 409 at the receiver end operate outside of network 411 to send and receive packets through computer network 411. In addition, both the device 401 at the sender end and the device 409 at the receiver end may each be coupled with other complementary devices to perform any of the tasks shown in FIG. 4.

In one implementation, on the sender device 401, a probe of packets is sent to traverse a network path within computer network 411. Sending the probe(s) of packets may include generating a probe train 402, generating a number of packets for each probe 403, and sending the packets 404 to the computer network (e.g., to traverse a particular network path).

At the device 409 on the receiver end of the network path, the probe of packets are received 405 and packet batching is detected 408. Packet batching may be detected if a contiguous set of packets that traversed the computer network 411 associated with negative DIAD times plus a packet associated with a positive DIAD time traversed the computer network 411 just before the contiguous set of packets are identified. If packet batching is detected 408, the device 409 at the receiver end of the network path communicates such information to the sender device 401 to determine the number of packets to be included in each probe 403 of the next probe train.

For example, the number of packets per probe may be adjusted based on the packet length size of the identified packet batch. Alternatively, in some implementations, the device 409 at the receiver end of the network path can determine the number of packets that can be generated per probe and this information can be communicated 410 to the sender device 401.

Next, the device 409 at the receiver end may be filtered to exclude some of the identified packet batches 406 according to pre-set criteria. In addition, packets with bad timing or which have been reordered may be discarded. After such pre-filtering, for each probe, the packet of the probe with the lowest One-Way Delay may be selected. Advantageously, one or more packets of the unfiltered identified packet batches may be used to estimate a bandwidth of the network path (407).

Figure 5:
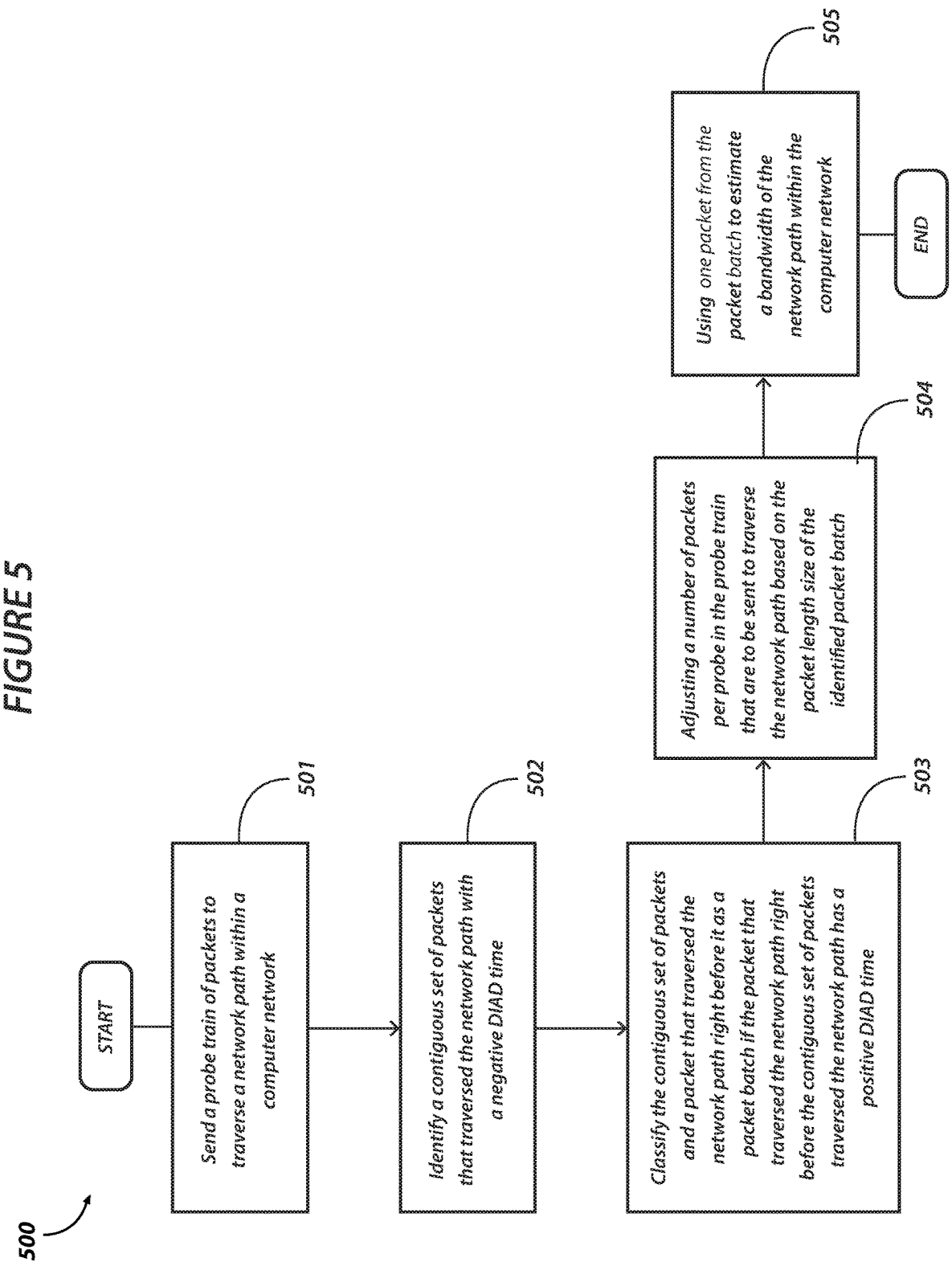
FIG. 5 is a flowchart for a process for packet batch filtering consistent with a system and method of the present disclosure.

FIG. 5 is a flowchart for a process for packet batch filtering consistent with a system and method of the present disclosure. Flowchart 500 begins with sending a probe of packets to traverse a network path within a computer network (block 501). Next, identifying a contiguous set of packets that traversed the network path with negative DIAD times (block 502).

If a packet that traversed the first network path right before the contiguous set of packets traversed the network path has a positive DIAD time, the packets are classified as a packet batch (503).

Next, a number of packets per probe is adjusted based on the length of an identified packet batch (block 504). Finally, the at least one packet of the packet batch is used to estimate a bandwidth of the network path within the computer network (block 505).

Figure 6:
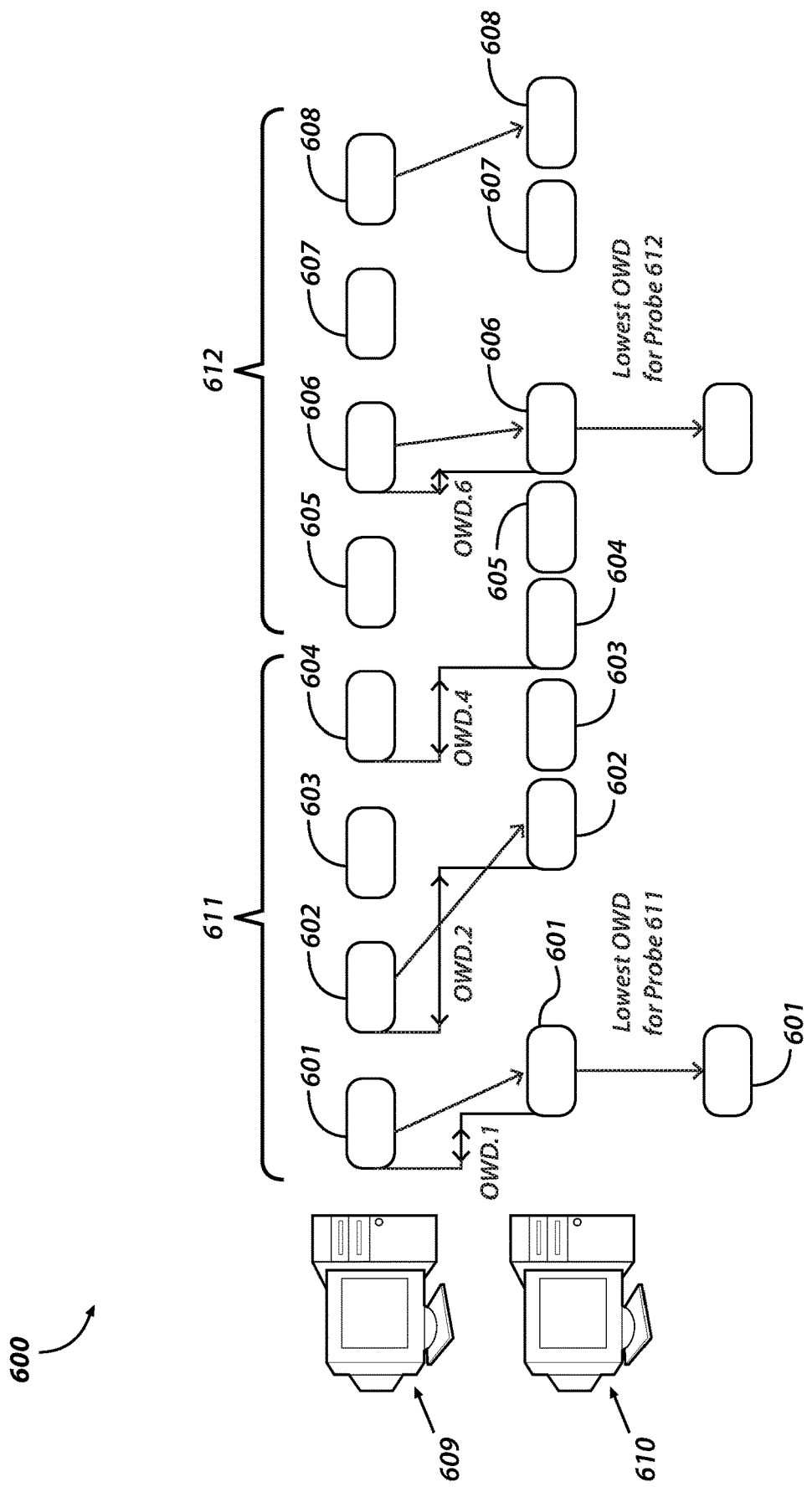
FIG. 6 is an illustration of a train of probes traversing through a network path with various One-Way Delay times.

FIG. 6 is an illustration of a train of probes traversing through a network path 600 with various One-Way Delay times. As shown, a train of two probes 611, 612 of packets are dispatched into the network 600. Each probe 611, 612 has four packets (packets 601-604 and packets 605-608, respectively) in the illustrated example.

Each packet of probes 611, 612 that are sent from device 609 may be impacted by various network conditions and therefore have different OWD times. For example, the OWD times for packets 601, 602, 604, and 606 are illustrated as OWD.1, OWD.2, OWD.4, and OWD.6, respectively. Advantageously, one or more packets of a train of probes may be used to estimate a bandwidth of the network path 600.

In one embodiment of the present disclosure, a packet from each probe of of a probe train may be selected to estimate the bandwidth of the network path 600. In the example shown in FIG. 6, packet 606 may be selected from probe 612 as a suitable packet to estimate a network path's 600 bandwidth because the packet has the lowest OWD time of the packets of probe 612. In some implementations, a single packet is chosen from each probe to estimate the bandwidth of a network path 600.

The present disclosure also provides network path estimation techniques which employ the use of multiple packets per probes. Extended batch filtering is an example of a multiple-packet network path estimation technique. In one embodiment of the present disclosure, extended packet batch filtering includes to phases. In a first phase, a single packet is selected per probe. In one embodiment of the present disclosure, the single packet selected is the packet of the probe with the lowest One-Way Delay. As such, in the first phase, at least one packet per probe is selected for bandwidth estimation.

In a second phase of extended batch filtering, all packets which are followed by a packet associated with a positive DIAD are selected as suitable packets to estimate a network's bandwidth. The packet associated with the positive DIAD may be part of the same probe or a next probe. Notably, the second phase of the extended batch filtering may result in only a few false positives. In some implementations, when a packet is followed by a packet associated with a positive DIAD, typically there exists a gap after the packet which is larger than when transmitted. It is likely that this packet is the last packet of a packet batch or a packet that is not part of a packet batch.

FIG. 7 is yet another flowchart 700 of a process for selecting a packet from a probe train for network bandwidth estimation consistent with a system and method of the present disclosure. The process described by flowchart 700 may be implemented by a computing device employed in computer network systems.

Flowchart 700 begins with sending a train of probes to traverse a network path within a computer network (block 701). Next, after receiving the train of probes, selecting a single packet per probe with a lowest OWD (block 702). Further, selecting from each probe, all packets of the probe which traversed the network path right before a packet associated with a positive DIAD traversed the network path (block 703). Lastly, estimating a bandwidth of the network path based on analyzing any of several metrics for each selected packet (block 704). In some implementations, all of the selected packets may be classified as a group of suitable test packets to determine a bandwidth of the network path.

In one embodiment, the size of a next probe train of packets to send along the network path is based on a packet length size of the longest packet batch identified in the train of probes.

As described herein, the present disclosure provides techniques to detect packet batching using measured negative queuing to mitigate the effect of packet batching for network path estimation techniques, particularly for networks with speeds that exceed 1 Gb/s.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

While illustrative embodiments of the application have been described in detail herein, it is to be understood that the inventive concepts may be otherwise variously embodied and employed, and that the appended claims are intended to be construed to include such variations, except as limited by the prior art.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method, comprising:
sending packets to traverse a first network path within a computer network;
identifying a contiguous set of packets that traversed the first network path each with a negative Difference Inter-Arrival and Inter-Departure (DIAD) time; and
in response to identifying a packet that traversed the first network path right before the contiguous set of packets traversed the first network path has a positive DIAD time, classifying the contiguous set of packets and the packet that traversed the first network path right before the contiguous set of packets traversed the first network path as a packet batch; and
in response to identifying the packet with the positive DIAD is less than a pre-determined threshold, excluding each classified packet batch from being used in estimating a bandwidth of the first network path, the pre-determined threshold being an absolute value of a sum of all of the negative DIAD times associated with the contiguous set of packets.

2. The method of claim 1 further comprising using at least one packet of the packet batch to estimate a bandwidth of the first network path within the computer network in response to identifying the packet with the positive DIAD greater than or equal to the pre-determined threshold.

3. The method of claim 1 further comprising computing a DIAD time of each packet that traverses the first network path by computing the difference in a One-Way Delay (OWD) time of a current packet and the OWD time of a packet which traversed the first network path before the current packet.

4. The method of claim 1 further comprising computing the DIAD time of each packet by computing the difference between an Inter-Arrival Time (IAT) and an Inter-Departure Time (IDT) of a current packet that traversed the first network path.

5. The method of claim 1 further comprising excluding the classified packet batches that have a packet length size that is less than a pre-determined number of packets.

6. The method of claim 1 further comprising sending packets to traverse a second network path that is different than the first network path and comparing a degree of packet batching that occurs along the first network path and the second network path.

7. The method of claim 1, further comprising in response to identifying a first packet within the packet batch has a DIAD time that is less than a pre-determined factor of an IDT of the first packet, classifying the packet batch as a false positive.

* * * * *